(12) United States Patent
Silva

(10) Patent No.: US 6,554,363 B1
(45) Date of Patent: Apr. 29, 2003

(54) TRAVELING PILLOW

(76) Inventor: Scott D. Silva, 5624 Dewey Dr., Fair Oaks, CA (US) 95628

( * ) Notice: Subject to any disclaimer, the term of this patent is extended or adjusted under 35 U.S.C. 154(b) by 0 days.

(21) Appl. No.: 10/113,563

(22) Filed: Apr. 2, 2002

(51) Int. Cl.⁷ .................................................. A47C 1/10
(52) U.S. Cl. .................... 297/397; 297/482; 297/DIG. 6
(58) Field of Search ............................. 297/DIG. 6, 397, 297/482, 391, 219.1, 220, 228.12, 228.13

(56) References Cited

U.S. PATENT DOCUMENTS

| | | | |
|---|---|---|---|
| 4,786,080 A | * | 11/1988 | Jay |
| 4,838,611 A | | 6/1989 | Talaugon |
| D309,393 S | | 7/1990 | Talaugon |
| 5,064,245 A | | 11/1991 | Stephens |
| 5,108,152 A | | 4/1992 | Reilly et al. |
| 5,114,185 A | * | 5/1992 | Reedom |
| 5,322,349 A | * | 6/1994 | Gianino |
| 5,332,292 A | | 7/1994 | Price et al. |
| 5,584,536 A | | 12/1996 | White |
| 5,620,234 A | | 4/1997 | Gunby |
| 5,785,388 A | | 7/1998 | Curtis |
| D408,962 S | | 5/1999 | Reagan |
| 5,964,504 A | * | 10/1999 | Hogan et al. |
| 6,010,192 A | | 1/2000 | King |
| 6,017,094 A | * | 1/2000 | Syiek |
| 6,086,158 A | * | 7/2000 | Zeoli |
| 6,203,110 B1 | * | 3/2001 | Proteau et al. |
| 6,394,554 B1 | * | 5/2002 | Hingle |
| 6,409,271 B1 | * | 6/2002 | Caramanis |

* cited by examiner

Primary Examiner—Milton Nelson, Jr.
(74) Attorney, Agent, or Firm—Richard C. Litman

(57) ABSTRACT

The present device is a seat belt pillow apparatus for removably attaching a pillow to a sash strap of a conventional lap and sash type seat belt. The seat belt pillow apparatus has a sash strap cover, which cover is removably fastened to the sash strap. A pillow is provided with a fastener on its outer surface whereby the pillow may be removably attached to the sash strap cover.

6 Claims, 3 Drawing Sheets

TRAVELING PILLOW

BACKGROUND OF THE INVENTION

1. Field of the Invention

The present invention generally relates to automobile accessories. More specifically, the present invention is drawn to a seat belt pillow for use with passenger restraint seat belts.

2. Description of Related Art

The most common seat belt configuration currently utilized by automotive manufacturers is of the lap and sash type (i.e., incorporating a lap belt and sash belt). Other configurations include the lap configuration only or the full harness. The lap seat belt configuration which provides limited occupant restraint simply overlies the waist of the occupant and is usually found in the middle of rear bench seats of automobiles. The full harness configuration consists of two vertical strap members which overlie the shoulders and connect with a lap seat belt member. Seat belts of the lap and sash type are now mandatory safety items in all front and rear seats of automobile and other passenger vehicles.

Most passengers who tend to fall asleep on long journeys invariably tend to lean either into or away from the sash belt. In a collision, a tendency to lean forwardly or into the sash belt facilitates the restraining function of the seat belt, as the body of the passenger maintains contact with the overlying sash belt.

The proper functioning of the seat belt is compromised in passengers who tend to lean away from the sash belt. This is especially common with young children who tend to flop out of the sash belt when asleep. In the most extreme situation, there is a possibility of a young child or small adult slipping out of an incorrectly worn seat belt as a consequence of a sudden braking or stopping force.

In the case of the full harness configuration, optimal protection is obtained provided the seat belt is worn correctly. There is a possibility that lash or other neck injuries may occur due to the fact that the shoulders are firmly restrained, leaving the head free to move rearwardly or laterally.

There are pillows currently available on the market which fit around the sleeping passenger's neck. These pillows, which are generally of the inflatable variety, are mainly for passenger comfort and do not purport to be safety devices. In this respect, they do not encourage passengers to lean in either direction, nor are they meant to be used in conjunction with a seat belt.

There are a number of examples of cushions or head rests for attachment to seat belts (in particular the sash belt) which consist of a cushion being folded around the sash belt, or the sash belt being inserted between opposed parts of the cushion. In each case, the cushion is attached to the sash belt by appropriate releasable fastening means, such as a hooked pile fastener assembly located on adjacent ends of the cushion or headrest. The cushion may then be moved along the seat belt as may be required by the user.

Several published patents illustrate the state of the art in seat belt pillows. U.S. Pat. No. Des. 309,393 issued on Jul. 24, 1990 to Margie C. Talaugon shows an ornamental design of a car seat pillow. U.S. Pat. No. Des. 408,962 issued on May 4, 1999 to Jennifer O. Reagan shows another ornamental design of a seat belt cushion.

U.S. Pat. No. 4,838,611 issued on Jun. 13, 1989 to Margie C. Talougon describes a car seat pillow having a pair of said pillows engaged with opposite sides of a child's head, a neck pillow extending between the side pillows, and tether straps for attaching the pillows to the shoulder straps of a car seat with the side pillows being positioned above the shoulder straps toward opposite sides of the seat for supporting engagement with the child's head and the neck pillow being positioned toward the back of the seat for engagement with the back of the child's neck.

U.S. Pat. No. 5,064,245 issued on Nov. 12, 1991 to Gina L. Stephens describes a pillow construction for mounting and positioning adjacent a side rotating wall of an associated child's car seat that includes an elongate tubular cushioned member mounting a pillow member at its upper terminal end.

U.S. Pat. No. 5,108,152 issued on Apr. 28, 1992 to Robert J. Reilly et al. describes a one piece cushioning device for a child's car seat that has a main body defining a head rest and a pair of extending arms that define a pair of shoulder belt covers. Each arm is sized and shaped to fit around a shoulder belt of the car seat. Closures are provided to secure the arms around the shoulder belts.

U.S. Pat. No. 5,332,292 issued on Jul. 26, 1994 to Pamela A. Price et al. describes a portable protection cushion arrangement for a toddler's car seat.

U.S. Pat. No. 5,584,536 issued on Dec. 17, 1996 to Edwin J. White describes a cushioned seat belt attachment that is adapted to be positioned over the shoulder restraint portion of a vehicle seat belt in order to reduce any pressure that is applied to the chest of a wearer.

U.S. Pat. No. 5,620,234 issued on Apr. 15, 1997 to Judy W. Gunby describes a seat belt cushion that includes a cushion having a foam like interior which is permanently encased by a cushion face.

U.S. Pat. No. 5,785,388 issued on Jul. 28, 1988 to Phillip Curtis discloses a seat belt pillow adapted to fit around a passenger's neck.

U.S. Pat. No. 6,010,192 issued on Jan. 4, 2000 describes a traveling pillow having a slope adapted for contoured support of the head and neck of the user. A rubber-backed flap extends downwardly past the back and shoulders of the user to allow the weight from the user's back and shoulder area to maintain the pillow in a fixed position during use.

None of the above inventions discloses a seat pillow apparatus adapted for removably attaching a pillow to the sash belt of a conventional lap and sash seat belt as will subsequently be described and claimed in the instant invention.

SUMMARY OF THE INVENTION

The present invention is a seat belt pillow apparatus for removably attaching a pillow to a sash strap of a conventional lap and sash type seat belt. The seat belt pillow apparatus has a sash strap cover, which cover is removably fastened to the sash strap. The strap cover is removably attached to the sash strap. A pillow is provided with means on its outer surface, whereby the pillow may be removably attached to the aforementioned sash strap cover.

The seat belt pillow apparatus may be used by children or adults to comfortably and safely rest their heads while traveling in an automobile. The seat belt pillow apparatus of the present invention also has the added benefit of reducing neck discomfort commonly associated with resting in a vertical position while seated in an automobile.

Accordingly, it is a principal object of the invention to provide a seat belt pillow apparatus for use with a conventional lap and sash type seat belt.

It is another object of the invention to provide a seat belt pillow apparatus, which apparatus provides a safe and stable head rest for a passenger.

It is a further object of the invention to provide a seat belt pillow apparatus, which apparatus is removably attached to the sash of a conventional lap and sash type seat belt.

It is an object of the invention to provide improved elements and arrangements thereof in an apparatus for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
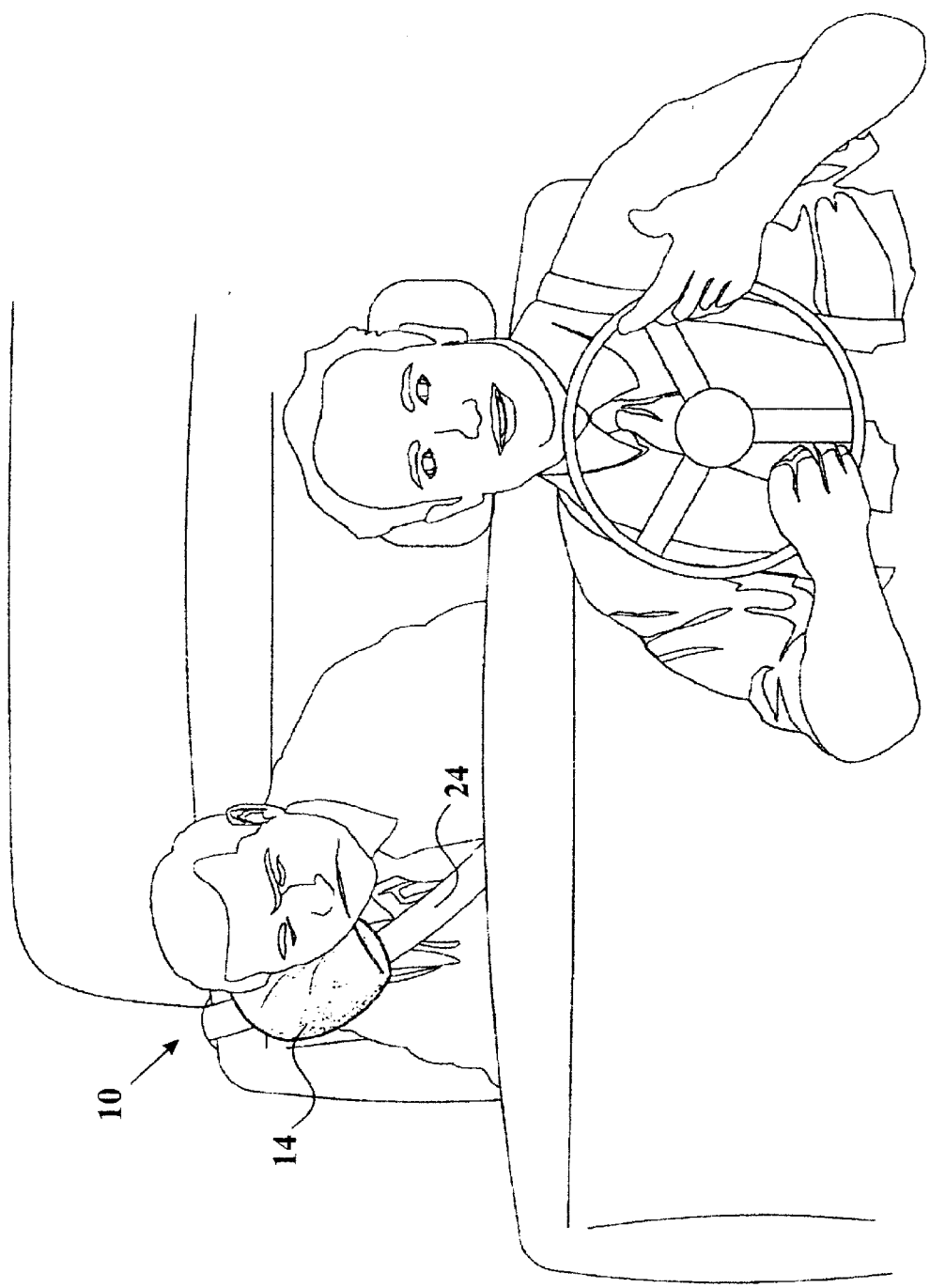
FIG. 1 is an environmental, perspective view of a seat belt pillow apparatus according to the present invention.
Figure 2:
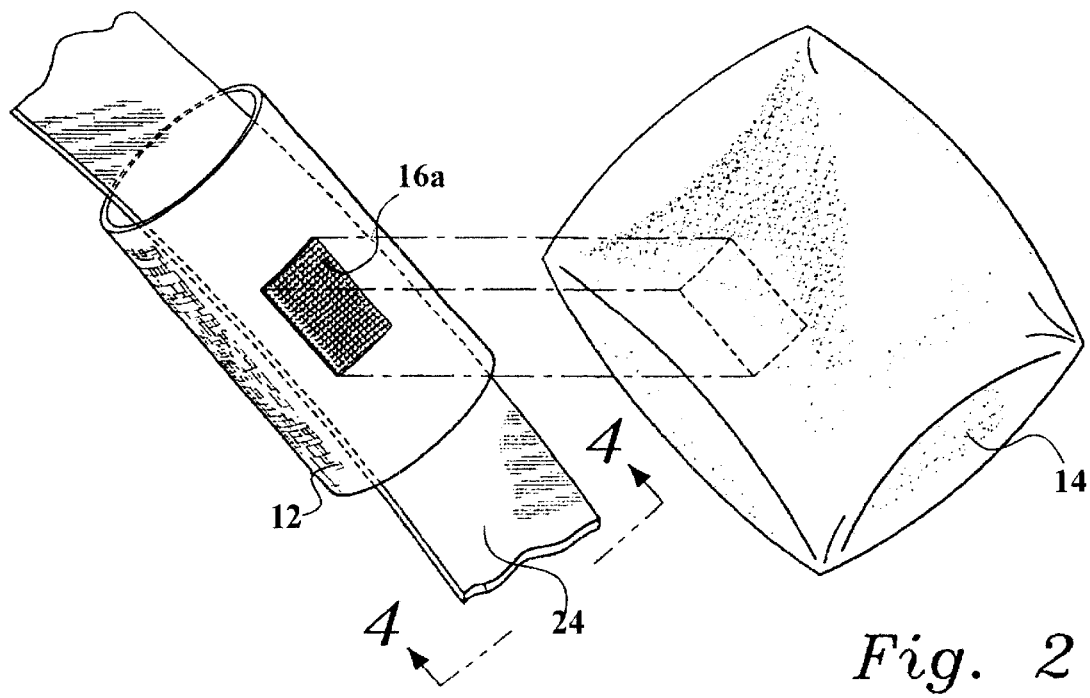
FIG. 2 is a partial, exploded, perspective view of a seat belt pillow apparatus according to a preferred embodiment of the invention.
Figure 3:
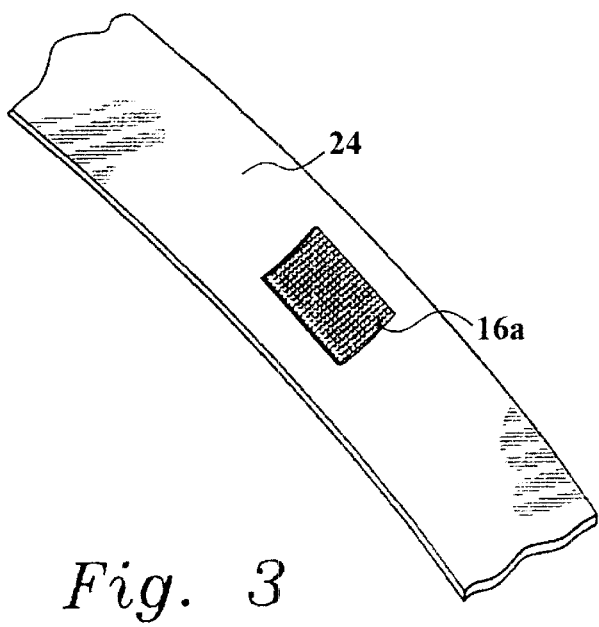
FIG. 3 is a partial, perspective view of a sash belt strap according to the present invention.

A seat belt pillow apparatus generally indicated at 10 is illustrated in FIG. 1. As shown, a passenger rests his head against a pillow 14 which is removably attached to the strap 24 of a seat belt sash. Further details relating to the structural configuration of the seat belt pillow apparatus 10 may be appreciated by referring to FIGS. 2–4.

The seat belt pillow apparatus 10 is preferably designed to include a sash strap cover 12 and a pillow 14. A first hook and loop type fastener 16, 16a is disposed on the respective outer surfaces of pillow 14 and cover 12, whereby the pillow may be removably attached to the cover 12. A second hook and loop type fastener 18, 18a is respectively disposed on the inner surface of cover 12 and the outer surface of strap 24, whereby cover 12 may be removably attached to strap 24.

Figure 4:
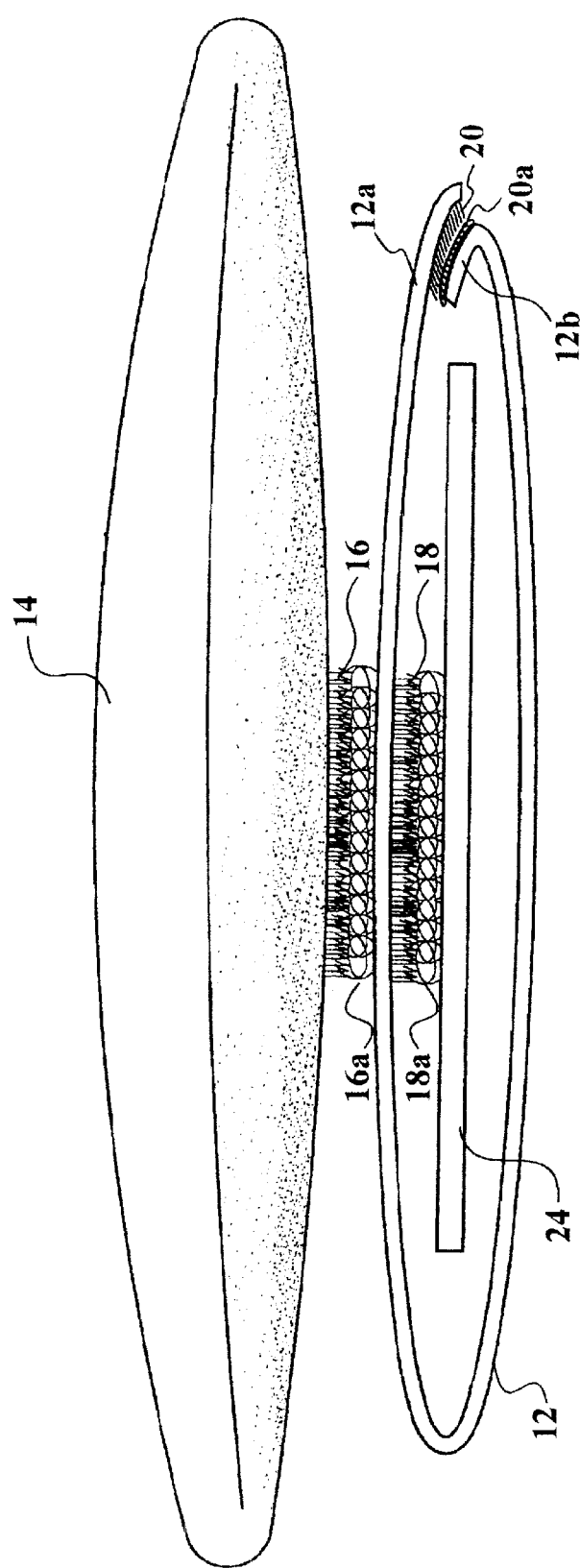
FIG. 4 is an end view of a seat belt pillow apparatus according to a preferred embodiment of the present invention.

As best illustrated in FIG. 4, the strap cover 12 is formed by a length of material having free ends 12a, 12b. A third hook and loop type fastener 20, 20a is disposed on the free ends 12a, 12b, whereby cover 12 may encircle the strap and the free ends fastened together. This construction allows both the pillow and the cover to be easily removed for cleaning, etc. and quickly reattached when desired.

Conventional stitching or a comparable attachment means may be used to attach the hook and loop fasteners to the various components. Although hook and loop fasteners are preferred, it is obvious that other fasteners (buttons, snaps, etc.) may be utilized if desired.

It is to be understood that the present invention is not limited to the sole embodiment described above, but encompasses any and all embodiments within the scope of the following claims.

I claim:

1. In combination, a seat belt pillow apparatus and a sash strap of a conventional lap and sash seat belt, said sash strap having an outer face, said combination comprising:

a sash strap cover, said cover having a first end, a second end, an inner surface and an outer surface, whereby said cover is adapted to encompass said sash strap;

a first means disposed on said first end and said second end of said sash strap cover for fastening said first end to said second end;

a second means for fastening said sash strap cover to said sash strap; and a pillow, said pillow having an outer surface; and a third means for attaching said pillow to said sash strap cover.

2. The combination as recited in claim 1, wherein said first means is a hook and loop fastener.

3. The combination as recited in claim 2, wherein said second means is disposed on said inner surface of said sash strap cover and said outer face of said sash strap.

4. The combination as recited in claim 3, wherein said second means is a hook and loop fastener.

5. The combination as recited in claim 4, wherein said third means is disposed on said outer surface of said sash strap cover and said outer surface of said pillow.

6. The combination as recited in claim 5, wherein said third means is a hook and loop fastener.

\* \* \* \* \*